United States Patent
St. Thomas et al.

(10) Patent No.: US 10,861,045 B2
(45) Date of Patent: Dec. 8, 2020

(54) AUTOMATICALLY LABELING CLUSTERS OF MEDIA CONTENT CONSUMERS

(71) Applicant: TiVo Solutions Inc., San Carlos, CA (US)

(72) Inventors: Brian St. Thomas, Durham, NC (US); Christopher Ambrozic, Alviso, CA (US)

(73) Assignee: TiVo Solutions Inc., San Jose, CA (US)

(*) Notice: Subject to any disclaimer, the term of this patent is extended or adjusted under 35 U.S.C. 154(b) by 204 days.

(21) Appl. No.: 15/258,981

(22) Filed: Sep. 7, 2016

(65) Prior Publication Data

US 2018/0067939 A1    Mar. 8, 2018

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0204* (2013.01)

(58) Field of Classification Search
CPC ......... G06F 17/30056; G06F 17/30719; G06F 17/30722; G06F 17/30867; G06F 17/30044; G06F 17/30772; G06F 3/0482; G06F 17/3053; G06F 3/04842; G06F 11/3438; G06F 17/30598; G06F 17/16; G06F 17/30601; Y10S 715/963; H04L 67/22; H04L 41/22
See application file for complete search history.

(56) References Cited

U.S. PATENT DOCUMENTS

| | | | | |
|---|---|---|---|---|
| 8,972,404 B1* | 3/2015 | Lewis | ................ | G06F 17/3071 707/737 |
| 2006/0015902 A1* | 1/2006 | Matsuura | ........... | H04N 7/17318 725/46 |
| 2007/0271287 A1* | 11/2007 | Acharya | ............... | G06F 16/285 |
| 2009/0089246 A1* | 4/2009 | Chi | ................... | G06F 17/30705 |
| 2011/0066942 A1 | 3/2011 | Barton et al. | | |
| 2012/0179693 A1* | 7/2012 | Knight | .............. | G06F 17/30743 707/748 |
| 2014/0074839 A1* | 3/2014 | Popp | ................... | G06F 16/9535 707/737 |
| 2014/0129500 A1* | 5/2014 | Nice | ....................... | G06N 5/02 706/46 |

(Continued)

*Primary Examiner* — Augustine K. Obisesan
(74) *Attorney, Agent, or Firm* — Haley Guiliano LLP

(57) ABSTRACT

An analytics platform configured to create clusters of media content consumers and to automatically generate human-readable, text labels that describe each of the created clusters is disclosed. An analytics platform may use any of a number of clustering algorithms to group a population of media content consumers into a set of user clusters based on viewing history data, user profile data, and/or any other data associated with the consumers. Furthermore, the analytics platform may be configured to create, based on the viewing history data and/or other data associated with a selected sample of users from each cluster, a text label for each cluster. For example, if viewing history data for a population of users includes channel and genre identifiers associated with media content items accessed by users of the population, a generated text label may provide an indication of channels and/or genres popular with users of each particular cluster.

20 Claims, 4 Drawing Sheets

(56) References Cited

U.S. PATENT DOCUMENTS

| | | | |
|---|---|---|---|
| 2014/0149425 A1* | 5/2014 | Kalmes | G06F 17/30029 707/748 |
| 2014/0282666 A1* | 9/2014 | Comstock | H04N 21/252 725/18 |
| 2015/0039620 A1* | 2/2015 | Ning | G06F 17/30053 707/740 |
| 2015/0339034 A1* | 11/2015 | Garcia | G06F 17/241 715/738 |
| 2016/0274744 A1* | 9/2016 | Neumann | H04N 21/252 |
| 2016/0323619 A1* | 11/2016 | Lewis | H04N 21/44222 |
| 2016/0373820 A1* | 12/2016 | Meyer | H04N 21/251 |
| 2018/0052852 A1* | 2/2018 | Griesmeyer | G06F 8/61 |

* cited by examiner

AUTOMATICALLY LABELING CLUSTERS OF MEDIA CONTENT CONSUMERS

TECHNICAL FIELD

Embodiments relate generally to automatically generating labels for clusters of media content consumers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

For a variety of reasons, it is often useful to segment a population of media content consumers into groups, where the consumers may be grouped based on similar viewing habits, personal characteristics, or any other attributes. In this context, a media content consumer refers broadly to any user that accesses various types of media content (e.g., television programs, movies, internet-based content, etc.) using one or more types of media devices (e.g., set-top boxes, desktop computers, portable devices, etc.). For example, advertisers may find it useful to group media content consumers in order to target advertisements to particular consumer segments, content providers may find it useful to know which types of media content are of greatest interest to particular consumer segments, and so forth.

Current approaches for segmenting populations of media content consumers often involve grouping consumers based on manually selected attributes. For example, an advertiser trying to target advertisements to particular groups may search available viewing history and/or other user data to find males between the ages of 18-30 who watch the television program "Big Bang Theory" or a group of 30-50 year olds who frequently watch movies. However, these approaches for grouping media content consumers are based largely on guesses about which attributes are most relevant and provide little context about why the users in a particular group are related apart from the manually selected attributes.

In other cases, clustering techniques may be used to group media content consumers, where a clustering algorithm may be used to automatically create groups from a population of consumers based on detected similarities. However, existing clustering approaches similarly fail to provide context about why particular groups of users are clustered together. For example, without selecting several users from an automatically created cluster and manually inspecting the selected users' viewing histories, it is often difficult to determine which characteristics best define the group (e.g., if the cluster represents avid viewers of sports, action movies, or cartoons, etc.). This presents a number of challenges to using clustering techniques to readily identify user groups for targeted advertising, understanding audience behavior, and for other purposes.

DETAILED DESCRIPTION

Figure 1:
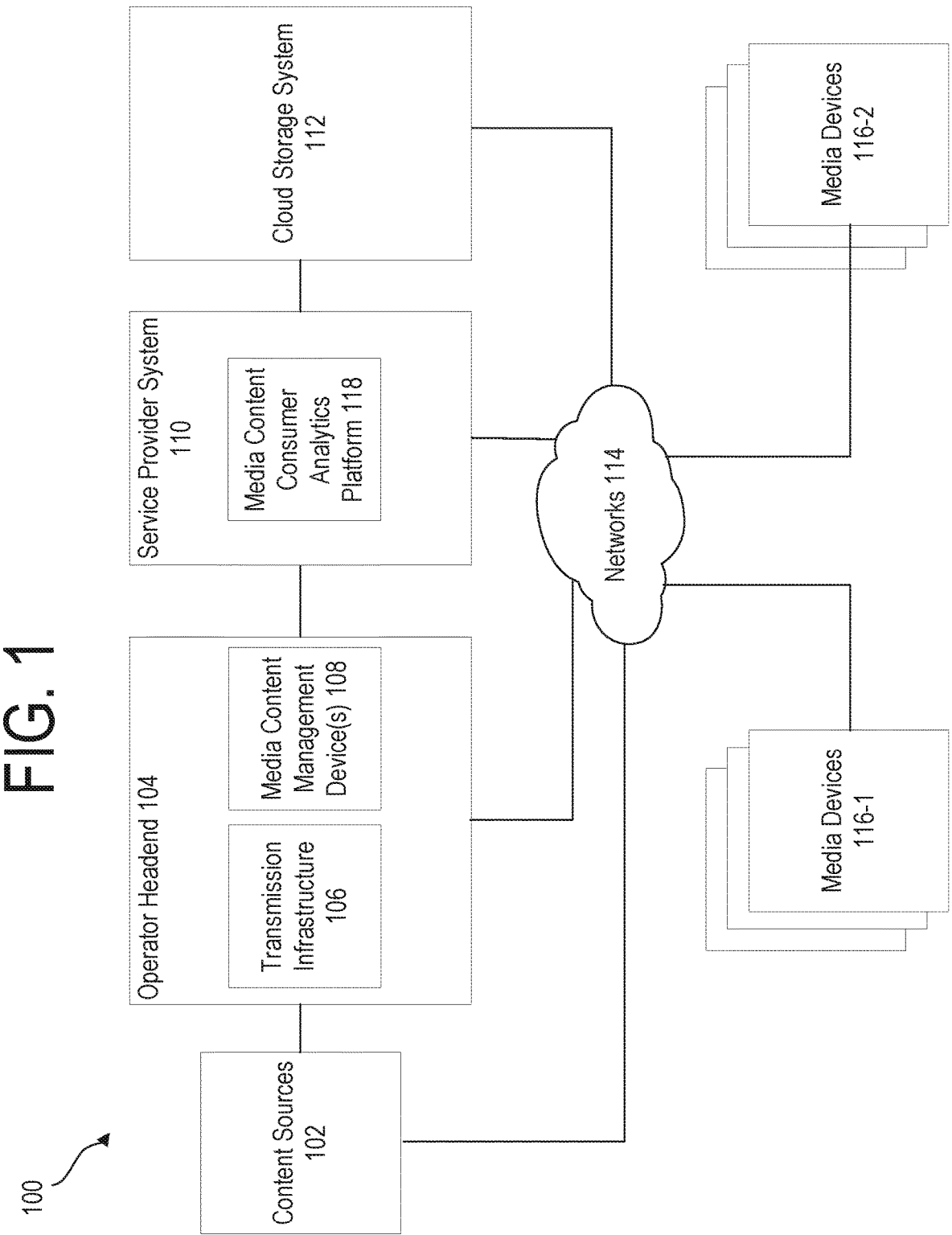
FIG. 1 is a block diagram of an example system for automatically generating text labels for clustered groups of media consumers, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
   2.0. Structural Overview
      2.1. System Overview
      2.2. Example Media Device
   3.0. Functional Overview
   4.0. Example Embodiments
   5.0. Implementation Mechanism—Hardware Overview
   6.0. Extensions and Alternatives

1.0. General Overview

Approaches, techniques, and mechanisms are disclosed related to a computer-implemented analytics platform configured to create clusters of media content consumers and to automatically generate human-readable, text labels that describe each of the created clusters. In an embodiment, an analytics platform may use any of a number of clustering algorithms (e.g., K-means, hierarchical, model-based, etc.) to group a population of media content consumers into a set of user clusters based on viewing history data, user profile data, and/or any other data associated with the consumers. Furthermore, and as described in more detail hereinafter, the analytics platform may be configured to create, based on the viewing history data and/or other data associated with a selected sample of users from each cluster, a text label for each cluster. For example, if viewing history data for a population of users includes identifiers of channels (e.g., MTV, TNT, CBS, etc.) and genres (e.g., drama, sports, cartoons, etc.) associated with media content items accessed by users of the population, a generated text label may provide an indication of channels and/or genres popular with users of each particular cluster (e.g., "Action and Comedy on HBO Family and Cartoon Network" or "Sports and Movies on ESPN and Netflix").

According to an embodiment, a computer-implemented analytics platform may be configured to generate one or more graphical user interfaces that enable analysts or other users to provide input enabling the analytics platform to create user clusters, generate cluster labels, and to display statistics and other information related to an analyzed population of media content consumers. For example, the graphical user interfaces may be used by an advertiser analyst to identify consumer segments of interest for targeting advertisements, by a content provider analyst to determine types of media content of greatest interest to consumers, by a call center analyst to assist a customer with selecting an appropriate cable package, among other uses.

As one particular example of an instance when contextual cluster labels may be useful, consider a call center analyst providing support to a television service provider. The call center analyst may receive a call from a customer of the television service provider during which the customer expresses a general dissatisfaction with his or her current television content package (e.g., because his or her current subscription includes channels the customer never watches or does not include other channels of interest to the customer). Without additional information, the call center analyst may have difficulty determining which channels and types of media content are of greatest interest to the customer without a time-consuming question and answer investigation process. However, according to embodiments described herein, an analytics platform may be able to automatically assign a human-readable label to the customer based on clustering and labeling the customer as part of a broader customer population (e.g., an automatically generated label may indicate that the customer predominantly watches sports and drama on ESPN and HBO.) With this information, the call center analyst may be able to more easily select a content package matching the customer's interests without manually inspecting the customer's entire viewing history or based on a time-consuming inquiry process.

In other aspects, the invention encompasses a computer apparatus and a computer-readable medium configured to carry out the foregoing techniques.

2.0. Structural Overview 2.1. System Overview

FIG. 1 is a block diagram of an example system 100 that may be used to implement a media content consumer analytics system, in accordance with one or more embodiments. System 100 comprises one or more computing devices and these one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, a system 100 includes one or more media devices 116, including media devices 116-1 and media devices 116-2. As used herein, a media device 116 generally refers to any type of computing device that is capable of receiving media content items, such as television programs, movies, video on demand (VOD) content, etc., from a cable signal, terrestrial signal, digital network-based data, etc. In FIG. 1, for example, a media device 116-1 may include a TV-tuner input that can be used to play, record, stream, and/or otherwise access media content items received from one or more content sources 102. Content sources 102 generally may include broadcast content sources and/or broadband content sources. For example, one content source 106 may include a live television broadcast feed that is provided by a cable operator. Other example content sources 102 include, but are not limited to, Video On Demand (VOD) libraries, third party content providers (e.g., Netflix®, Amazon Prime®, etc.), web-based media content, satellite broadcast content, terrestrial broadcast content, etc. Example media devices 116-1 include, but are not limited to, a set-top box (STB), digital video recorders (DVRs), personal computers, tablet computers, handheld devices, televisions, and other computing devices.

In an embodiment, system 100 may further include one or more IP-enabled media devices 116-2. In general, an IP-enabled media device 116-2 may refer to any type of computing device that is capable of receiving media content over one or more digital networks 114, such as the public Internet, intranet, LAN, WAN, etc., but which may or may not include a TV-tuner input. Examples of media devices 116-2 include, without limitation, STBs, DVRs, personal computers, smartphones, tablets, laptops, game devices, media servers, digital media receivers, televisions, terrestrial antennas, etc. A typical user may own several media devices 116, which may be located and used at various locations throughout the user's home and elsewhere.

In an embodiment, media devices 116 are coupled to content sources 102, operator headends 104, service provider systems 110, and/or cloud storage systems 112 via one or more networks 114. Networks 114 broadly represent one or more cable networks, LANs, WANs, cellular networks (e.g., LTE, HSPA, 3G, older technologies, etc.), and/or internetworks using any of wired, wireless, terrestrial microwave, or satellite links, and may include the public Internet. Furthermore, each media device 116 may be coupled to one or more other media devices via one or more networks 114.

In an embodiment, each media device 116 generally may be configured to perform one or more actions relative to media content items, including receiving media content items from content sources 102, playing media content items, scheduling recordings of media content items, uploading all or portions of media content items to a cloud storage system, streaming media content items to other media devices, etc. In an embodiment, a service provider system 110 generally may provide listing information, content availability data, and information about media content items, and also manage cloud-based storage of media content items and provide media devices controlled access to media content items via one or more networks 114.

In an embodiment, an operator headend 104 generally represents a system for receiving and processing television and other media content signals from one or more content sources 102, and for distributing media content based on the media content signals to various media devices 116. As one example, an operator headend 104 may represent a cable television headend that receives and processes signals (e.g., received via satellite, coaxial cable, microwave link, fiber-optics, the Internet, etc.) from content sources 102, and distributes the processed video content to media devices 116 using a transmission infrastructure 106. Transmission infrastructure 106 generally may include components capable of transmitting media content items using any number of encoding and transmission formats including, but not limited to, quadrature amplitude modulation (QAM), Advanced Television Systems Committee (ATSC), satellite, Digital Video Broadcasting-Terrestrial (DVB-T), IP-based transmission over one or more networks, etc.

In one embodiment, an operator headend 104 may host one or more media content management devices 108. In general, media content management devices 108 may include one or more computing devices and storage components configured to store media content items and to provide access to the media content items by media devices 116. In an embodiment, user accounts associated with the media content management system may be provided with an amount of storage at media content management devices 108 to store media content items selected for recording. The user accounts may, for example, be created and managed by a service provider system 110, and each user account may be associated with one or more media devices 116 (e.g., based on a user account login at the media devices). Media content items stored at media content management devices 108 may be delivered to media devices 116 by the operator headend 104 using a transmission infrastructure 106.

In an embodiment, a media content management system may further include one or more cloud storage systems 112. In general, a cloud storage system 112 represents a data storage system that is accessible to media devices 116 via one or more networks (e.g., a network 114) and is typically owned and managed by an entity other than a user of the media device 116. In an embodiment, a cloud storage system 112 may be managed and operated by an operator of a service provider system 110, or a cloud storage system 112 may be operated by a third-party entity. Examples of third-party cloud storage systems include Amazon Web Services (AWS), Microsoft Azure, Google Cloud Storage, etc. Similar to storage available at an operator headend 104, user accounts associated with a service provider system 110 may be provided with an amount of storage space at cloud storage system 112. The amount of storage available to each user account at media content management devices 108 and/or cloud storage system 112 may be presented to users as a single pool of available data storage or, in other examples, a user may be able to separately manage storage available at media content management devices 108 and at a cloud storage system 112.

In one embodiment, a cloud storage system 112 generally may be used to store media content items selected for recording by users of media devices 116 (e.g., as individual scheduled recordings or as part of a media schedule associated with a media content collection). Media content items stored in cloud storage system 112 may be made available to users of media devices 116 until the media content items are selected for deletion by a user, exceed a cloud storage deletion policy, or based on any other deletion policy. In one embodiment, media content received by the operator headend 104 from content sources 102 may be delivered to the cloud storage system 112 via a fixed-bandwidth line to facilitate storage of media content items selected for recording by users.

In an embodiment, a service provider system 110 comprises one or more computing devices generally configured to manage requests from media devices 116 (e.g., media content information and search requests, recording requests, playback requests, content deletion requests, pause point management across devices, etc.), and to manage storage of media content items across one or more operator headends 104 and cloud storage systems 112, among other services and features described herein.

Based on various factors, it may be more efficient at times to stream stored media content items to media device 116 from media content management devices 108 at an operator headend 104 instead of from a cloud storage system 112, and vice versa. For example, a transmission infrastructure 106 of an operator headend 104 typically may be more reliable and have greater bandwidth capacity than networks available for transmitting media content items from a cloud storage system 112 to media devices 116. However, a transmission infrastructure 106 may not be capable of transmitting media content items to some types of media devices 116 (e.g., mobile devices that are not connected to the transmission infrastructure 106 and some media content formats may not be suitable for transmission by an operator headend 104. In these and other instances, for example, it generally may be more efficient to stream the media content items from a cloud storage system 112.

To facilitate streaming of media content items from either an operator headend 104 or cloud storage system 112 when appropriate, in one embodiment, a service provider system 110 may be configured to determine which media content items to store at the operator headend 104, which media content items to store at cloud storage systems 112, or both. For example, a service provider system 110 may determine which media content items selected for recording by one or more users are most likely to be viewed within a particular amount of time or with a particular frequency. For media content items which it is determined are likely to be watched soon after the items are selected for recording, for example, those items may be stored at the operator headend 104. Storage of these items at the operator headend 104 may be beneficial, for example, to take advantage of the more robust transmission infrastructure 106. In contrast, media content items that are determined to be unlikely to be selected for viewing in the near future, or are likely to be viewed on a media device that is not connected to a transmission infrastructure 106, may be stored at a cloud storage system 112 to reduce the amount of data stored at the operator headend 104.

Example criteria that a service provider system 110 may use to determine where to store media content items include information about particular media content items and historical data for one or more user accounts. For example, the criteria may include an age of the media content item (e.g., measured from an original air date), a user's recent viewing behavior (e.g., whether the user recently watched an earlier episode in the same series), an overall popularity of the media content items across all user accounts, the aggregated viewing habits across media devices 116 in a particular household, a rate at which a user is currently viewing episodes in a series and the number of episodes remaining, etc.

In one embodiment, a service provider system 110 may use various criteria, such as the example criteria described above, to generate a weighting factor, also referred to herein as a relevancy factor, for each media content item selected for recording by a user account. For example, a relevancy factor may indicate for each media content item a likelihood that a request to play the media content item is received within the next N days, or within some other time period. A relevancy factor may be generated for each media content item relative to an entire populations of user accounts, a targeted group of user accounts, or for individual user accounts. In an embodiment, the relevancy factors may be used to determine where to store particular media content items (e.g., at an operator headend 104 and/or cloud storage system 112), video and/or audio formats in which to store particular media content items, bit rates at which to store and/or transmit particular media content items, etc. In an embodiment, a relevancy factor may be used to determine if and when to generate and store transcoded versions of particular media content. For example, if a user pauses a media content item being viewed in the user's home, depending on a relevancy factor associated with the media content item, a transcoded version of the media content item may be generated and stored in the cloud storage system 112, the transcoded version suitable for playing on a mobile device. As another example, depending on a relevancy factor, a service provider system 110 may decide to maintain in storage only a single low bitrate recording of the media content item if the media content item is determined unlikely to be watched in the near future.

As one example of how a media content management system 100 may manage transmission and storage of media content items, when a media device 116 tunes to live media content (e.g., a live television stream), the selected media content may be provided to the media device 116 by an operator headend 104 via a transmission infrastructure 106 (e.g., a QAM infrastructure). If a user of the media device 116 pauses playback of the live media content, in one embodiment, a service provider system 110 may cause a recording of the same media content to start at the operator headend 104 and/or at a cloud storage system 112. When the user resumes playback of the media content item from the same media device 116 or from another media device 116 associated with the user's account, the media content item may then be streamed to the media device 116 via an IP-based network from either the operator headend 104 or cloud storage system 112. If the user subsequently catches up to the live point of the media content item, the cloud-based media content management system 100 may continue to stream the media content item to the media device 116 via an IP-based network, or may instead resume transmission of the media content item using the transmission infrastructure 106.

As another example of the cloud-based media content management system 100 managing transmission and storage of media content items, a service provider system 110 may be configured to store at an operator headend 104 and/or cloud storage system 112 a "live buffer" of media content tuned to by one or more media devices 116. For example, each time a media device 116 tunes to a receive a particular media content item, service provider system 110 may start a recording of the media content item at operator headend 104 and/or cloud storage system 112, where the recording is managed as a rolling buffer of a configurable duration of time (e.g., 30 minutes). The rolling buffer for a particular media content item may be automatically deleted after a media device tunes to different media content (e.g., in response to a channel change, selection of different content from an electronic program guide (EPG), etc.), or the buffer may be maintained in storage for a configurable period of time (e.g., 30 minutes). If a user subsequently selects a particular media content item to record, the rolling buffer can be used as part of the recording stored for the user, among other uses.

Figure 2:
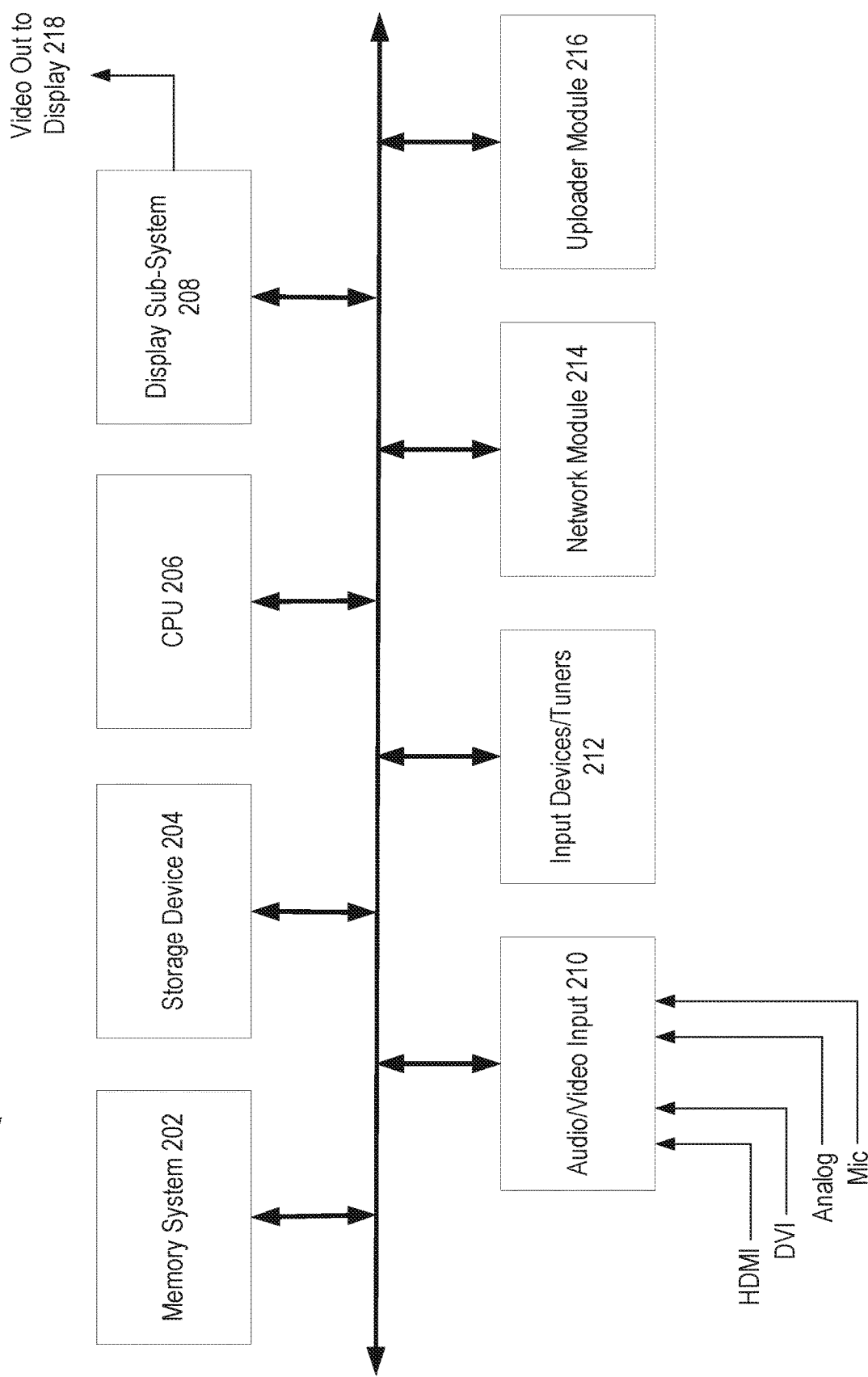
FIG. 2 is a block diagram of an example media device, in accordance with one or more embodiments.

Although FIG. 2 includes an operator headend 104 that receives media content from content sources 102, distributes the media content to media devices 116, and that also may be a source of media content items stored in a cloud storage system 112, other implementations may not directly involve an operator headend 104. In one embodiment, media devices 116 may receive media content items from content sources 102 (e.g., via an operator headend 104 or directly from a content source 102 via an IP network) and the media content items may be uploaded from the media devices 116 to cloud storage. For example, the content sources 102 may include providers of over-the-top content (OTT), video on demand (VOD), and other content that is transmitted to media devices 116 over the Internet and without the involvement of a cable or satellite television system operator. In this and other examples described herein, a service provider system 110 may not directly interface with an operator headend 104 to enable storage and access to media content items in cloud storage.

In one embodiment, a service provider system 110 may include a media content consumer analytics platform 118. At a high level, an analytics platform 118 may include one or more modules for tracking user viewing habits (e.g., based on requests received from media devices 116 to play, record, download, etc., selected content items) and/or for retrieving viewing history data from other sources, clustering users into groups based on similar viewing histories and/or other attributes, creating human-readable labels for created clusters, among other features described herein. Although the analytics platform 118 is depicted in FIG. 1 as a component of a service provider system 110, in other examples, an analytics platform 118 may be part of another system component or implemented as a standalone system.

System 100 illustrates only one of many possible arrangements of components configured to provide the functionality described herein. Other arrangements may include fewer, additional, or different components, and the division of work between the components may vary depending on the arrangement. Each component of system 100 may feature an open port, API, or other suitable communication interface by which the component may become communicatively coupled to other components of system 100 as needed to accomplish any of the functions of system 100 described herein.

2.2. Example Media Device

FIG. 2 illustrates an example block diagram of a media device in accordance with one or more embodiments. As shown in FIG. 2, a media device 116 may include multiple components such as a memory system 202, one or more storage devices 204, a central processing unit (CPU) 206, a display sub-system 208, an audio/video input 210, one or more input devices/tuners 212, a network module 214, an uploader module 416, and/or other components used to perform the functionality described herein. In an embodiment, a media device 116 may be a DVR. A multifunction media device is described U.S. patent application Ser. No. 12/631,740, entitled "Multifunction Multimedia Device," which is owned by the Applicant and is hereby fully incorporated by reference.

In an embodiment, storage devices 204 generally represent secondary storage accessible by the media device 116. A storage device 204 may include, but is not limited to, any combination of, one or more of: Solid State Drives (SSD), hybrid hard drives, hard drives, etc. Each media device 116 may or may not include one or more storage devices 204. If a media device 116 includes a storage device 204, the storage may be used for various purposes including storing all or portions of recorded media content items, providing a buffer for media device tuners 212, pre-caching portions of media content items stored by a cloud storage system, etc.

In an embodiment, audio/video input 210 generally corresponds to any component that includes functionality to receive audio and/or video input (e.g., HDMI, DVI, Analog, etc.) from an external source. For example, the audio/video input 210 may be a DisplayPort or a high definition multimedia interface (HDMI) that can receive input from different devices. The audio/video input 210 may receive input from a set-top box, DVR, a Blu-ray disc player, a personal computer, a video game console, an audio/video receiver, a compact disk player, an enhanced versatile disc player, a high definition optical disc, a holographic versatile disc, a laser disc, mini disc, a disc film, a RAM disc, a vinyl disc, a floppy disk, a hard drive disk, etc. A media device 116 may include any number of audio/video inputs 210.

In an embodiment, input device/tuners 412 generally represents any input components that can receive a content stream (e.g., through cable, satellite, internet, network, terrestrial antenna, etc.). In a tuner configuration, input device/ tuner 412 may allow one or more received frequencies to pass through while filtering out others (e.g., by using electronic resonance, etc.). A television tuner, for example, may convert an RF television transmission into digital audio and video signals which can be further processed to produce sound and/or an image or accept digital signals such as MPEG2, MPEG4, etc. In an embodiment, each media device 116 may have one or more tuners (e.g., quadrature amplitude modulation (QAM) tuners, Digital Video Broadcasting-Cable (DVB-C) tuners, Advanced Television Systems Committee (ATSC) tuners, etc.) for receiving live or on-demand television content from content sources 106. A tuner can be a physical tuner or a virtual tuner that represents an abstract perception of physical components used to receive broadcast content.

In an embodiment, a network module 414 generally represents any input component that can send and receive data over a network (e.g., internet, intranet, world wide web, etc.). Examples of a network module 414 include, but are not limited to, any of: a network card, network adapter, network interface controller (NIC), network interface card, wireless card, Local Area Network adapter, Ethernet network card, any other component that can send and receive information over a network, such as one or more networks 104. The network module 414 may also be used to directly connect with another device (e.g., a media device, a computer, a secondary storage device, etc.).

In an embodiment, input may be received by a media device 116 from any communicatively coupled device through wired and/or wireless communication segments. Input received by the media device 116 may be stored to the memory system 202 or storage device 204. The memory system 202 may include one or more different types of physical memory to store data. For example, one or more memory buffers (e.g., an HD frame buffer) in the memory system 202 may include storage capacity to load one or more uncompressed high definition (HD) video frames for editing and/or fingerprinting. The memory system 202 may also store frames in a compressed form (e.g., MPEG2, MPEG4, or any other suitable format), where the frames are then uncompressed into the frame buffer for modification, fingerprinting, replacement, and/or display. The memory system 202 may include FLASH memory, DRAM memory, EEPROM, traditional rotating disk drives, etc.

In an embodiment, central processing unit 206 may include functionality to perform the functions described herein using any input received by the media device 116. For example, the central processing unit 206 may be used to dynamically derive fingerprints from media content frames stored in the memory system 202. The central processing unit 206 may be configured to mark or identify media content or portions of media content based on tags, hash values, fingerprints, time stamp, or other suitable information associated with the media content. The central processing unit 206 may be used to modify media content (e.g., scale a video frame, etc.), analyze media content, decompress media content, compress media content, etc. A video frame (e.g., an HD video frame, 4K frame, etc.) stored in a frame buffer may be modified dynamically by the central processing unit 206 to overlay additional content (e.g., information about the frame, program info, a chat message, system message, web content, pictures, an electronic programming guide, video content, textual content, or any other suitable content) on top of the video frame, manipulate the video frame (e.g., stretching, rotation, shrinking, etc.), or replace the video frame in real time. Accordingly, an electronic programming guide, advertisement information that is dynamically selected, media content information, or any other text/graphics may be written onto a video frame stored in a frame buffer to superimpose the additional content on top of the stored video frame. The central processing unit 206 may be used for processing communication with any of the input and/or output devices associated with the media device 116. For example, a video frame that is dynamically modified in real time may subsequently be transmitted for display. The central processing unit 206 may be used to communicate with other media devices to perform functions related to synchronization, publication of data, etc.

In an embodiment, the display sub-system 208 generally represents any software and/or device that includes functionality to output (e.g., Video Out to Display 218) and/or actually display one or more images. Examples of display devices include a kiosk, a hand held device, a computer screen, a monitor, a television, projector, etc. The display devices may use different types of screens or display technology such as a liquid crystal display, cathode ray tube, a projector, a plasma screen, etc. The output from the media device 116 may be specially for formatted for the type of display device being used, the size of the display device, resolution (e.g., 720i, 720p, 1080i, 1080p, or other suitable resolution), etc. However, some media devices 116 may not have any display output components (e.g., a media device primarily configured to stream media content items to other media devices).

3.0. Functional Overview

Approaches, techniques, and mechanisms are disclosed that enable a media content consumer analytics platform to automatically create contextual labels for clusters of media content consumers. In one embodiment, an analytics platform 118 may be configured to create contextual labels for clusters of media content consumers in part by retrieving viewing history data for a population of users, clustering the population of users into a plurality of user clusters, and automatically generating human-readable labels for each cluster of the plurality of user clusters based on data associated with a selected sample of users of the cluster. An analytics platform 118 may further generate one or more user interfaces that enable analysts or other users to select particular populations of users to analyze, to provide input to customize one or more aspects of an analysis, to view one or more interfaces displaying cluster analysis results, among other features.

In an embodiment, each of the processes described in this section may be implemented using one or more computer programs, other software elements, and/or digital logic in any combination of general-purpose computing devices or a special-purpose computing devices, while performing data retrieval, transformation, and storage operations that involve interacting with and transforming the physical state of memory of the computing devices(s). In some embodiments, the processes are implemented in a system comprising media devices (e.g., DVRs, set-top boxes, personal computers, mobile devices, etc.) which may receive, play, record, and/or store media content items and a service provider system which manages user access to media content items, monitors user viewing history, and provides interfaces that facilitate analysis of populations of media content consumers. In other embodiments, the processes are implemented exclusively by one or more servers or by a single client computing device. Examples of such systems are described in the preceding sections.

Figure 3:
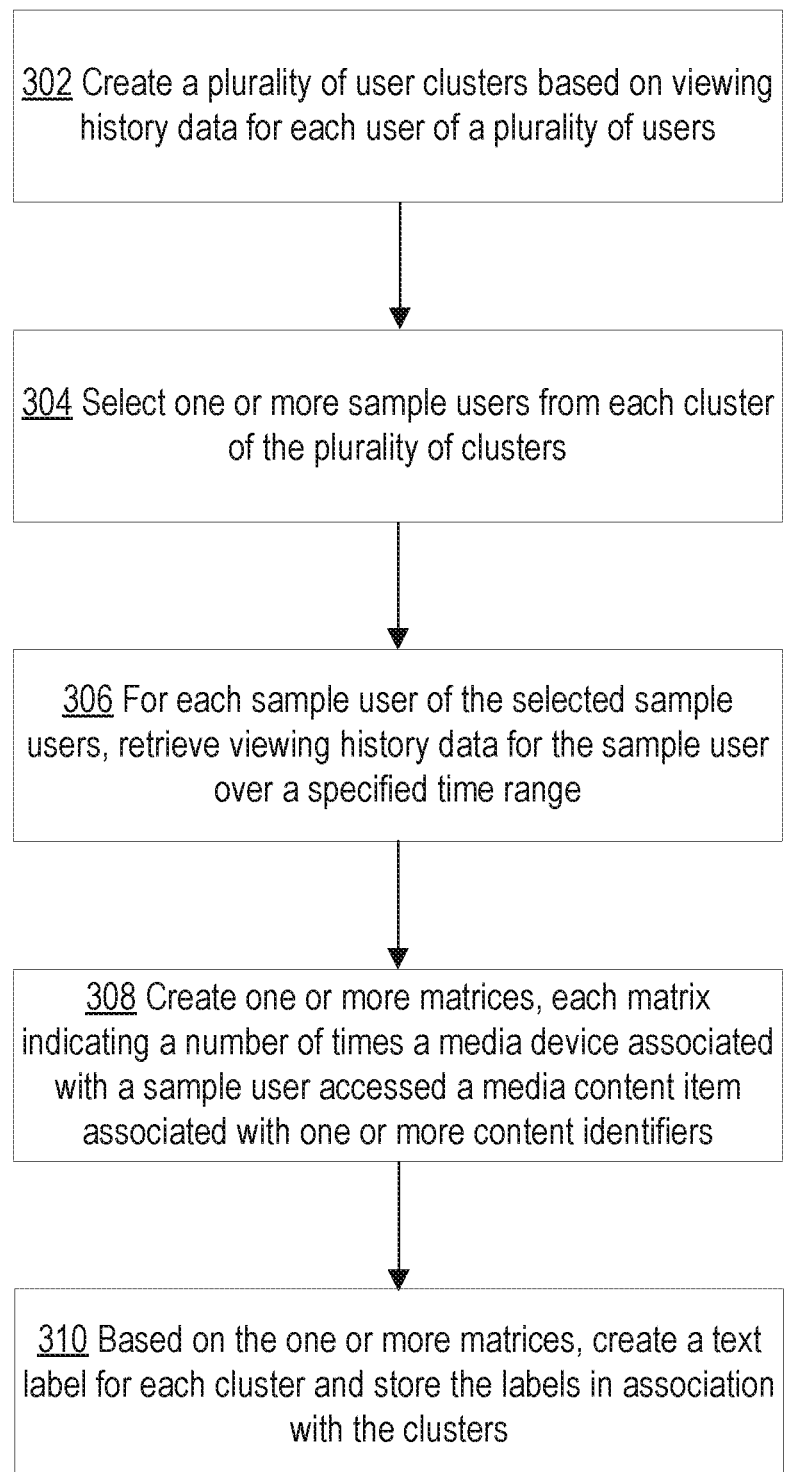
FIG. 3 depicts an example flow diagram for automatically generating text labels for clustered groups of media consumers, in accordance with the disclosed embodiments.

FIG. 3 depicts an example flow diagram for automatically creating text labels for clusters of media content consumers (also referred to herein more generally as users). Steps shown in FIG. 3 may be rearranged or omitted. Furthermore, additional steps not shown in FIG. 3 may be performed in accordance with one or more embodiments. Accordingly, the selection or arrangement of steps shown in FIG. 3 should not be construed as limiting.

At block 302, a plurality of user clusters are created based on viewing history data for each user of a plurality of users. In one embodiment, a media content consumer analytics platform 118 may be configured to create the user clusters based on data collected by the analytics platform 118, service provider system 110, and/or any other source of viewing history data or other data related to the plurality of users. The viewing history data may, for example, indicate each time particular media content items from content sources 102 are requested for playback, streaming, download, recording, and/or otherwise accessed by users of media devices 116. For example, each time a media content item is requested by a media device 116, a service provider system 110 may store data indicating a media device sending the request, a user associated with the requesting media device, a time at which the request was sent, a type of request (e.g., playback, record, download), which portions of the media content item are played by the media device, etc. The viewing history data may further include or reference various content identifiers associated with each media content item, including a channel identifier (e.g., identifying a source of the media content item such as a television channel, streaming content provider, etc.), a genre identifier (e.g., a content category such as drama, sports, movie, cartoon, etc.), and/or any other attributes of the media content item.

In one embodiment, an analyst or other user may provide input to one or more graphical user interfaces generated by an analytics platform 118 to create the user clusters. For example, an analytics platform 118 may generate interfaces that enable a user to select a particular population of users to investigate, select a time period for the investigation, and/or to indicate other investigation settings. The selection of a particular population may be based, for example, on selecting all available users for investigation, selecting users located in one or more particular geographic regions, or based on any other user attributes. An analyst may further provide input indicating that the investigation includes all available viewing history data or data from a selected period of time (e.g., the past month, past year, etc.). Default values may be used for one or more of the cluster settings if user input is not provided for one or more of the settings.

In an embodiment, an analyst may provide input specifying a number of user clusters to create for the selected user population, or an analytics platform 118 may determine a number of clusters to create automatically. In general, clustering a population of media content consumers includes segmenting the selected population into n clusters, where each cluster includes m users from the population (and where each cluster may contain a different number of users from other clusters). In many instances, it may be difficult for an analyst to know how many clusters n to create so that each of the clusters includes a set of users that is meaningful and accurate for the analyst's investigative purposes. One option for selecting a number of clusters is trial-and-error, where an analyst may choose a number of clusters, manually inspect the results to determine if the number of clusters produces satisfactory results, and refine the number of clusters if desired. In one embodiment, an analytics platform 118 may be configured to automatically select a number of clusters and/or determine whether a selected number of clusters is optimal for a selected population of media content consumers, for example, by using one or more methods for selecting a number of clusters (e.g., x-means clustering, determining information criteria, etc.).

As indicated above, the user clusters created by an analytics platform 118 may be based at least in part on viewing history data associated with a population of media content consumers. In one embodiment, as a basis for a clustering algorithm, an analytics platform 118 may use the viewing history data to create one or more matrices which indicate a view count of a collection of media content items over the population of users. However, as a population of users and a number of media content items grows in size, a size of such a matrix may become very large and adversely affect a speed at which the clustering computations can be performed. Thus, in one embodiment, an analytics platform 118 may use a matrix decomposition or other technique to reduce the size of one or more matrices representing view counts for a collection of media content items. For example, if a selected population of users includes approximately four (4) million users and viewing history data for those users is available relative to approximately 300,000 media content items, the analytics platform 118 may decompose the available viewing history data into a smaller matrix (e.g., where a vector of approximately fifty (50) values is associated with each user).

At block 304, one or more sample users are selected from each cluster of the plurality of clusters. For example, an analytics platform 118 may select a number of users from each cluster randomly, based on viewing data associated with the selected users, or based on any other criteria. In other embodiments, a sample of users from one or more of the clusters may include all users in the respective cluster.

In one embodiment, an analytics platform 118 may select sample users for each cluster based in part on determining an "average" or standard viewing history for users of the total population or for each cluster. For example, the analytics platform 118 may determine a total number of views for each user of the cluster and/or of the total user population, and then determine an average number of total views for the cluster and/or total population. In this example, the analytics platform 118 may select a number of sample users for each user cluster by selecting a number of users in the cluster that have a total number of views most similar (e.g., closest in number) to the calculated average. As an example, the analytics platform 118 may select the ten, twenty, or thirty users (or any other number of users) from each cluster with a total number of views closest to the average for the cluster.

At block 306, for each sample user of the selected sample users, viewing history data is retrieved for the sample user over a specified time range. In one embodiment, retrieving a user's viewing history data may include retrieving various content identifiers related to each media content item in the viewing history data such as, for example, a channel identifier and a genre identifier associated with each media content item in the history. For example, channel identifiers may include channel call signs such as "Fox", "Nickelodeon", "Cartoon Network", etc., or other content source identifiers such as "Netflix", "Hulu", "Amazon Prime". Genre identifiers may include names of content genres such as drama, movies, sports, cartoons, etc.

In this example, an analytics platform 118 may retrieve channel identifiers and genre identifiers for each media content item; in other examples, any other identifier(s) of attributes associated with the media content items may be used. For example, if a car company is interested in targeting advertisements to particular segments of a user population, and if information is available about particular vehicle types or brands displayed in various media content items accessed by the user population, the analytics platform 118 can build user clusters and/or label user clusters based on types of cars frequently displayed to the users in content items accessed by the users.

At block 308, one or more matrices are created for each cluster, each matrix indicating a number of times a media device associated with the selected sample users accessed a media content item associated with one or more content identifiers. In one embodiment, an analytics platform 118 may create at least three (3) separate matrices: a first matrix may include counts for each user and for each channel identifier; a second matrix may include counts for each user and for each genre identifier; and a third matrix may include counts for each user and for each combined genre identifier and channel identifier. For example, the first matrix may include, for each sample user and for each channel identifier, a number of times the sample user accessed a media content item associated with the channel identifier.

At block 310, a text label is created for each of the clusters based on the created matrices, and each text label is stored in association with the corresponding cluster. For example, based on the matrices created for each cluster, frequent pattern mining or other techniques may be used to find channel identifiers and genre identifiers that occur frequently with respect to the selected sample of users for the cluster. Based on determining frequently occurring channel and genre identifiers, the analytics platform 118 can then create a composite label based on the identifiers. In one embodiment, matrix decomposition or other techniques may be used on the matrices created for the selected samples of users to determine the appropriate labels. Depending on various settings, the analytics platform 118 can select one or more of the top channel identifiers, one or more of the top genre identifiers, and one or more combined channel and genre identifiers to create each cluster's text label. One example of resulting a text label for a particular cluster is "Action and Comedy on HBO Family and Cartoon Network", indicating that the selected sample users of the particular cluster frequently accessed media content items associated with the action and comedy genres and accessed the content items from the HBO Family and Cartoon Network content sources.

In one embodiment, an analytics platform 118 may store the text labels created for each of the clusters in association with the clusters (e.g., in a database or any other data structure), and may further use the text labels in any number of different interfaces to assist analysts with understanding the context of the clusters. For example, the text labels may assist analysts to readily understand in general the media content viewing preferences of the users in the cluster without the analysts manually inspecting the individual viewing histories of one or more users from the cluster. Understanding a general context and composition of each cluster may be useful in any number of applications including conducting advertising campaigns, working in call centers, overlaying viewing behavior on engagement behavior, etc.

In one embodiment, contextual text labels created and stored for each of a plurality of clusters may be used by call center employees to readily provide the employees with information about users requesting assistance. For example, a population of customers of a media content provider may be clustered and assigned labels by an analytics platform 118. If a particular customer from the population calls a help line requesting assistance regarding the customer's current media content subscription with the content provider, and if the call center employee can readily determine a cluster and label associated with the particular customer, the call center analyst may be able to quickly obtain an overview of the user's content preferences in order to better assist the customer.

As another example, an advertiser may use an analytics platform 118 to create and label a population of users to which the advertiser desires to serve advertisements. Based on text labels created for clusters of the population of users, the advertiser can obtain a general idea about which market segments exist in the population in order to better personalize advertisements. Furthermore, an analytics platform 118 may enable advertisers or other users to select particular user segments of a population to run promotional or other types of testing (e.g., multivariate A/B testing).

As yet another example, the assignment of labels to clusters may enable broadcasters or other entities to find groups of users from a population which may be most amenable to upsell of premium content. For example, a media content service provider may cluster a population of subscribers and find groups of users that frequently watch movies on standard channels in order to promote premium movie channels offered by the service provider to those users. In general, labels generated for each cluster provide a mechanism for analysts and other users to communicate about particular users or groups of users that exist within a population of media content consumers.

4.0. Example Embodiments

In an embodiment, a method or non-transitory computer readable medium comprises: creating, by a server, a plurality of user clusters based on media content viewing history data stored for each user of a plurality of users; for each particular user cluster of the plurality of user clusters: selecting one or more sample users from the particular user cluster; retrieving, for each sample user from the selected sample users, viewing history data for the sample user over a specified time range; creating one or more matrices for the one or more sample users, each matrix of the one or more matrices indicating a number of times a media device associated with a sample user accessed a media content item associated with one or more content identifiers; based on the one or more matrices created for the one or more sample users, creating a text label for the user cluster; storing the text label in association the user cluster.

In an embodiment, the method or non-transitory computer readable medium further comprises: wherein a number of user clusters created is based on a user selected value.

In an embodiment, the method or non-transitory computer readable medium further comprises: determining, for each user cluster of the plurality of user clusters, an average viewing history based on a number of times users of the user cluster accessed any media content item; wherein selecting the one or more sample users from the user cluster is based on selecting users from the user cluster with viewing histories similar to the average viewing history.

In an embodiment, the method or non-transitory computer readable medium further comprises: determining an average viewing history based on a number of times users of the plurality of users accessed any media content item; wherein selecting the one or more sample users from the user cluster is based on selecting users from the user cluster with viewing histories similar to the average viewing history.

In an embodiment, the method or non-transitory computer readable medium further comprises: wherein the one or more content identifiers include at least a channel identifier and a genre identifier.

In an embodiment, the method or non-transitory computer readable medium further comprises: wherein the one or more content identifiers include at least a channel identifier and a genre identifier; and wherein the text label is based on one or more channel identifiers and one or more genre identifiers.

In an embodiment, the method or non-transitory computer readable medium further comprises: causing display of a graphical user interface including display of the text label in association with a visual representation of the user cluster.

In an embodiment, the method or non-transitory computer readable medium further comprises: wherein the specified time range includes all available viewing history.

In an embodiment, the method or non-transitory computer readable medium further comprises: wherein each user cluster of the plurality of user clusters is associated with a separate text label.

In an embodiment, the method or non-transitory computer readable medium further comprises: wherein a first matrix of the one or more matrices includes counts of occurrences of the one or more sample users accessing media content items associated with channel identifiers, and a second matrix of the one or more matrices includes counts of occurrences of the one or more sample users accessing media content items associated with genre identifiers.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
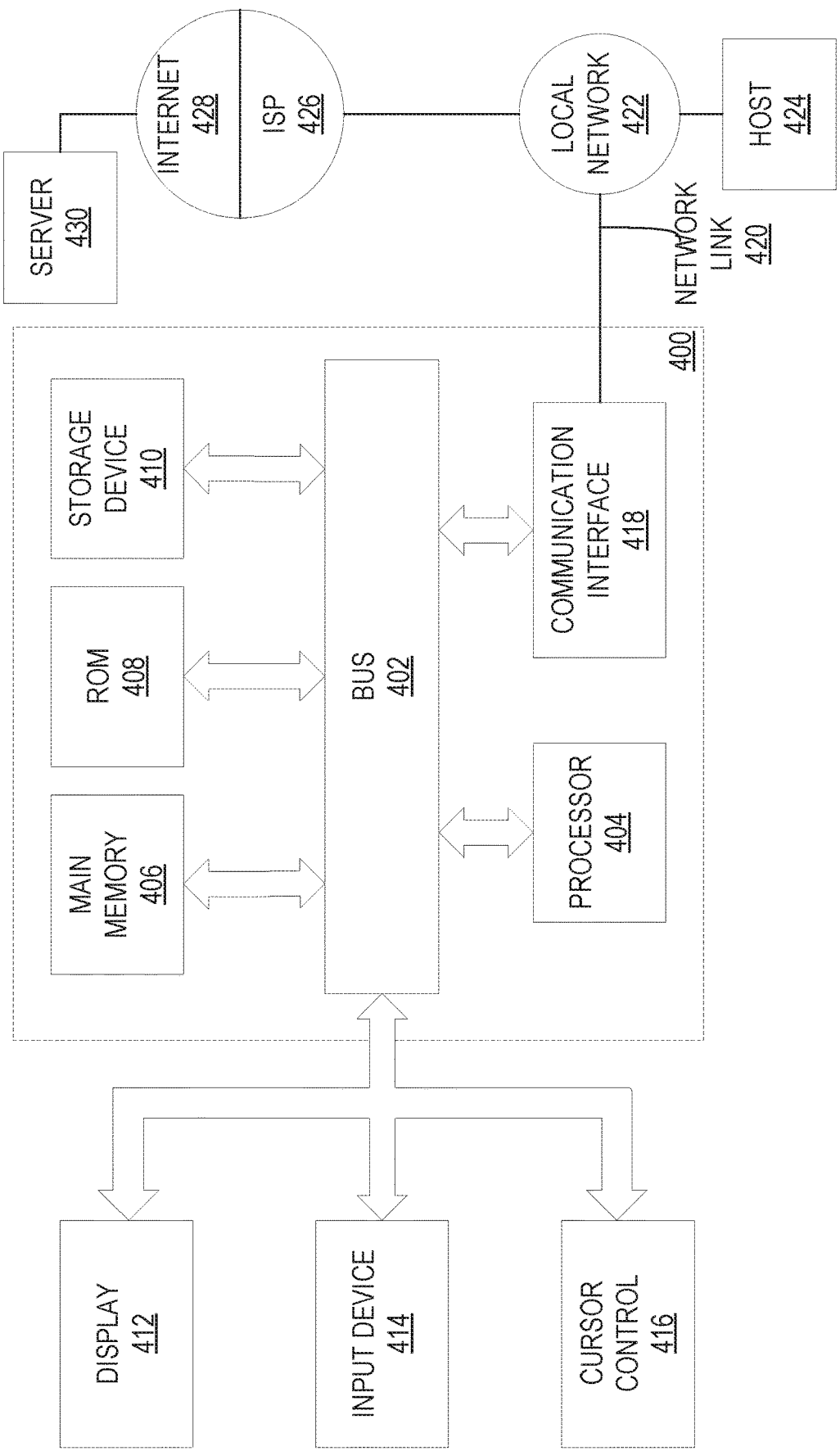
FIG. 4 is block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In an embodiment, some or all of the systems described herein may be or comprise server computer systems, including one or more server computer devices that collectively implement various components of the system as a set of server-side processes. The server computer systems may include web server, application server, database server, and/or other conventional server components that the depicted components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third third-party entities, on behalf of another entity for whom the components are deployed. In other embodiments, however, the described systems may be implemented entirely by computer systems owned and operated by a single entity.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   creating, by a server, a plurality of user clusters based on media content viewing history data stored for each user of a plurality of users; and
   for each particular user cluster of the plurality of user clusters:
      selecting one or more sample users from the particular user cluster;
      retrieving, for each sample user from the one or more sample users, viewing history data for the sample user over a specified time range;
      creating one or more matrices for the one or more sample users, each matrix of the one or more matrices indicating a number of times a media device associated with a sample user accessed a media content item associated with one or more content identifiers;
      determining, based on the created one or more matrices, a pattern of frequent genre identifiers identified for the one or more sample users within the created one or more matrices;
      determining, based on the created one or more matrices, a pattern of frequently accessed channel identifiers identified for the one or more sample users within the created one or more matrices;
      creating a composite text label for the user cluster based on the determined pattern of frequent genre identifiers, wherein the composite text label comprises a first portion based on the frequent genre identifiers and a second portion based on the frequent channel identifiers; and storing the composite text label in association with the user cluster.

2. The method of claim 1, wherein a number of user clusters created is based on a user selected value.

3. The method of claim 1, further comprising:

determining, for each user cluster of the plurality of user clusters, an average viewing history based on a number of times users of the user cluster accessed any media content item;

wherein selecting the one or more sample users from the user cluster is based on selecting users from the user cluster with viewing histories similar to the average viewing history.

4. The method of claim 1, further comprising:

determining an average viewing history based on a number of times users of the plurality of users accessed any media content item;

wherein selecting the one or more sample users from the user cluster is based on selecting users from the user cluster with viewing histories similar to the average viewing history.

5. The method of claim 1, wherein the one or more content identifiers include at least a channel identifier and a genre identifier.

6. The method of claim 1, wherein the one or more content identifiers include at least a channel identifier and a genre identifier; and wherein the text label is based on one or more channel identifiers and one or more genre identifiers.

7. The method of claim 1, further comprising causing display of a graphical user interface including display of the text label in association with a visual representation of the user cluster.

8. The method of claim 1, wherein the specified time range includes all available viewing history.

9. The method of claim 1, wherein each user cluster of the plurality of user clusters is associated with a separate text label.

10. The method of claim 1, wherein a first matrix of the one or more matrices includes counts of occurrences of the one or more sample users accessing media content items associated with channel identifiers, and a second matrix of the one or more matrices includes counts of occurrences of the one or more sample users accessing media content items associated with genre identifiers.

11. One or more non-transitory computer-readable storage media, storing instructions, which when executed by one or more processors, causes:

creating, by a server, a plurality of user clusters based on media content viewing history data stored for each user of a plurality of users; and for each particular user cluster of the plurality of user clusters:

selecting one or more sample users from the particular user cluster;

retrieving, for each sample user from the one or more sample users, viewing history data for the sample user over a specified time range;

creating one or more matrices for the one or more sample users, each matrix of the one or more matrices indicating a number of times a media device associated with a sample user accessed a media content item associated with one or more content identifiers;

determining, based on the created one or more matrices, a pattern of frequent genre identifiers identified for the one or more sample users within the created one or more matrices;

determining, based on the created one or more matrices, a pattern of frequently accessed channel identifiers identified for the one or more sample users within the created one or more matrices;

creating a composite text label for the user cluster based on the determined pattern of frequent genre identifiers, wherein the composite text label comprises a first portion based on the frequent genre identifiers and a second portion based on the frequent channel identifiers; and storing the composite text label in association with the user cluster.

12. The one or more non-transitory computer-readable storage media of claim 11, wherein a number of user clusters created is based on a user selected value.

13. The one or more non-transitory computer-readable storage media of claim 11, wherein the instructions, when executed by the one or more processors, further causes:

determining, for each user cluster of the plurality of user clusters, an average viewing history based on a number of times users of the user cluster accessed any media content item;

wherein selecting the one or more sample users from the user cluster is based on selecting users from the user cluster with viewing histories similar to the average viewing history.

14. The one or more non-transitory computer-readable storage media of claim 11, wherein the instructions, when executed by the one or more processors, further causes:

determining an average viewing history based on a number of times users of the plurality of users accessed any media content item;

wherein selecting the one or more sample users from the user cluster is based on selecting users from the user cluster with viewing histories similar to the average viewing history.

15. The one or more non-transitory computer-readable storage media of claim 11, wherein the one or more content identifiers include at least a channel identifier and a genre identifier.

16. The one or more non-transitory computer-readable storage media of claim 11, wherein the one or more content identifiers include at least a channel identifier and a genre identifier; and wherein the text label is based on one or more channel identifiers and one or more genre identifiers.

17. The one or more non-transitory computer-readable storage media of claim 11, wherein the instructions, when executed by the one or more processors, further causes display of a graphical user interface including display of the text label in association with a visual representation of the user cluster.

18. The one or more non-transitory computer-readable storage media of claim 11, wherein the specified time range includes all available viewing history.

19. The one or more non-transitory computer-readable storage media of claim 11, wherein each user cluster of the plurality of user clusters is associated with a separate text label.

20. The one or more non-transitory computer-readable storage media of claim 11, wherein a first matrix of the one or more matrices includes counts of occurrences of the one or more sample users accessing media content items associated with channel identifiers, and a second matrix of the one or more matrices includes counts of occurrences of the one or more sample users accessing media content items associated with genre identifiers.

\* \* \* \* \*